(12) United States Patent
Ferrigan

(10) Patent No.: US 6,827,377 B2
(45) Date of Patent: Dec. 7, 2004

(54) LOAD CARRIER FOR VEHICLE

(75) Inventor: Paul Ferrigan, Waxhaw, NC (US)

(73) Assignee: Mini-Fini, Ltd., Liverpool, NY (US)

(*) Notice: Subject to any disclaimer, the term of this patent is extended or adjusted under 35 U.S.C. 154(b) by 145 days.

(21) Appl. No.: 10/230,357

(22) Filed: Aug. 28, 2002

(65) Prior Publication Data

US 2004/0040995 A1 Mar. 4, 2004

(51) Int. Cl.$^7$ .................................................. B60R 19/24
(52) U.S. Cl. ........................................ 293/117; 293/155
(58) Field of Search ............................... 293/106, 116, 293/117, 142, 143, 155; 224/319, 320, 491, 497, 512–514, 516, 519

(56) References Cited

U.S. PATENT DOCUMENTS

| | | |
|---|---|---|
| 3,176,903 A | 4/1965 | Farley |
| 4,099,760 A | 7/1978 | Mascotte et al. |
| 4,125,214 A | 11/1978 | Penn |
| 4,239,253 A | 12/1980 | Golze |
| 4,610,458 A * | 9/1986 | Garnham ................ 280/495 |
| 4,674,933 A * | 6/1987 | Brown .................... 414/24.6 |
| 4,775,282 A * | 10/1988 | Van Vliet ................ 414/462 |
| 4,834,273 A * | 5/1989 | Cimino .................. 224/42.21 |
| 4,950,010 A * | 8/1990 | Denny .................... 293/117 |
| 4,989,765 A * | 2/1991 | Huebner ................ 224/485 |
| 5,427,289 A * | 6/1995 | Ostor ..................... 224/499 |
| 5,478,124 A * | 12/1995 | Warrington et al. ...... 293/125 |
| 6,099,061 A | 8/2000 | Gessay |
| 6,398,276 B1 * | 6/2002 | Smith ..................... 293/142 |
| 6,428,031 B1 * | 8/2002 | McCoy et al. ........... 280/495 |
| 6,540,277 B2 * | 4/2003 | McCoy et al. ........... 293/117 |
| 6,579,055 B1 * | 6/2003 | Williams ................ 414/462 |

* cited by examiner

Primary Examiner—D. Glenn Dayoan
Assistant Examiner—Greg Blankenship
(74) Attorney, Agent, or Firm—McCormick Paulding & Huber LLP (57) ABSTRACT

A unibody style automobile has bumper attachment pads for a crash bar and bumper cover assembly of conventional configuration. Removal of these bumper components provides access to these pads for a load carrier or beam that defines two coupling connections for a frame selected from a plurality of frames, each designed for a different load. All the frames have one fixed slide bolt received in one of the two sockets in the beam. A second bolt provides a very secure attachment point for each of these frames.

12 Claims, 13 Drawing Sheets

LOAD CARRIER FOR VEHICLE

FIELD OF THE INVENTION

This invention relates generally to load carriers for use at the rear of a vehicle, and deals more particularly with a load carrying device adapted for mounting to the vehicle by a unique carrying beam.

BACKGROUND OF THE INVENTION

The present invention, is intended for use with a present day automobile of the type having a conventional rear bumper which includes a decorative shock absorbing cover as well as a structural support member to which the cover is mounted. Such a structural bumper support is generally mounted to spaced attachment pads on the vehicle body. The present invention calls for removal of both the decorative cover and the structural support so as to provide a mount for a unique carrier beam which is provided with spaced support lands constructed and arranged to fit the spaced attachment pads in the vehicle body. The conventional bumper components, in the form of the decorative shock absorbing cover and the underlying structural support, are remounted to the vehicle after mounting the beam to the said attachment pads of the vehicle.

The above mentioned beam is provided with at least two rearwardly open sockets that are arranged in spaced vertical relationship to the support lands. The sockets are further provided inwardly of these lands so as to be spaced apart approximately half the horizontal distance between the vehicle attachment pads.

A typical load carrying device in the form of a bicycle rack for example, comprises a frame which is fitted with a slide bolt adapted to be received in one of the sockets, and to be locked in place by angular rotation of the frame relative to the socket. The socket is fixed relative to the vehicle as described above. When the frame or bicycle rack is rotated into position, a second slide bolt provided in a second portion of the frame, is aligned with the second of the two sockets to be slid into place into the second socket defining structure so as to anchor the frame to the vehicle.

Other frames can be configured for supporting other loads, such as skis, snowboards, and other personal sports related equipment.

A conventional trailer hitch is also provided as the load carrying device, in which case a trailer of conventional geometry can be secured to a load carrying device by providing a conventional trailer hitch ball for example, on a frame secured to the vehicle by the two slide bolts in the frame structure designed along the lines of the above-described bicycle rack frame.

Other variations of load carrying device frames are within the scope of the present invention as well. For example, a platform suitable for use as a table might be provided as the frame. Alternatively, a storage box can be provided on such a table or on its own frame as adapted for supporting such a storage box. Still further possibilities for the frame configuration are apparent to those of ordinary skill in the art to accommodate to fit particular sports related or recreational related activities.

DETAILED DESCRIPTION

Figure 2:
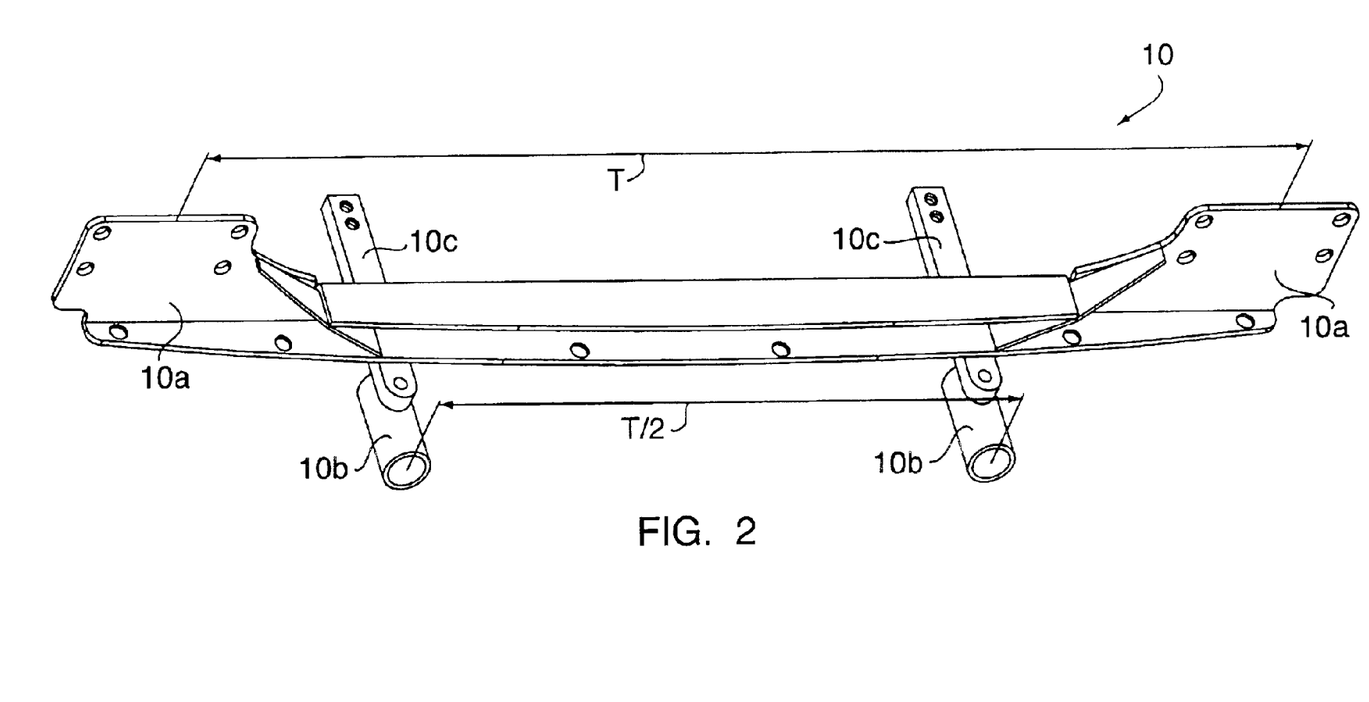
FIG. 2 shows a beam constructed in accordance with the present invention, such beam having spaced lands constructed and arranged so as to fit the spaced attachment pads in the vehicle body. The beam of FIG. 2 further includes at least two rearwardly opened sockets arranged below the lands and spaced inwardly thereof.
Figure 3:
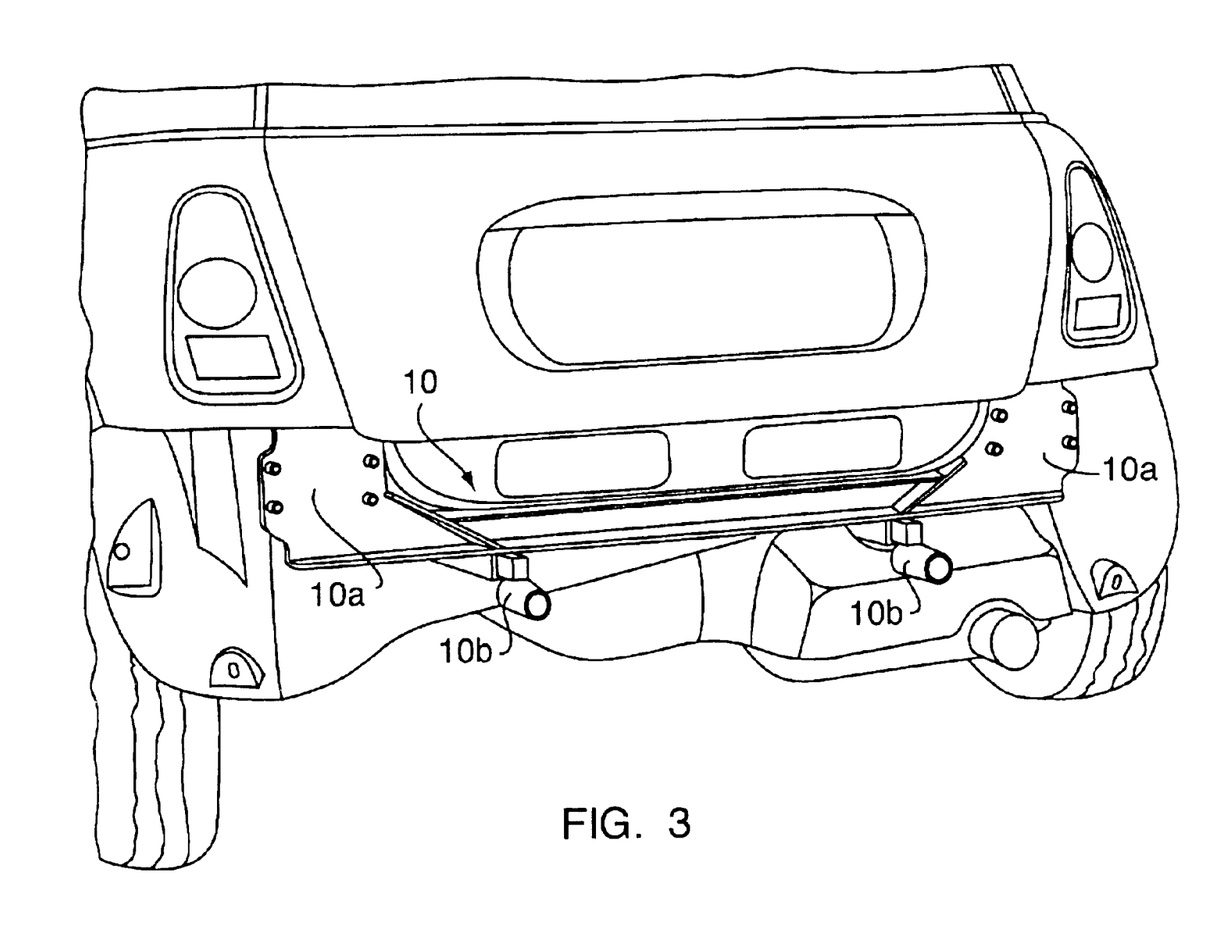
FIG. 3 shows the beam of FIG. 2 installed on the vehicle.

Turning now to the drawings in greater detail, and referring particularly to FIG. 2, a beam 10 is shown having spaced apart lands $10_A$, $10_A$ which lands are so constructed and arranged as to fit the spaced attachment pads in the vehicle body to which the device of the present invention is to be attached. FIG. 3 shows four threaded bolts securing each of these lands to the vehicle body.

The beam 10 has in addition to the lands $10_A$, $10_A$ rearwardly the open sockets $10_B$, $10_B$ arranged below and affect laterally from the lands. These sockets are spaced apart horizontally by a distance of approximately one-half the lateral spacing between the lands. Preferably, this spacing is in the range between one-half the springs T between the lands (T/2) spacing T and one-fourth that value (T/4).

Figure 4:
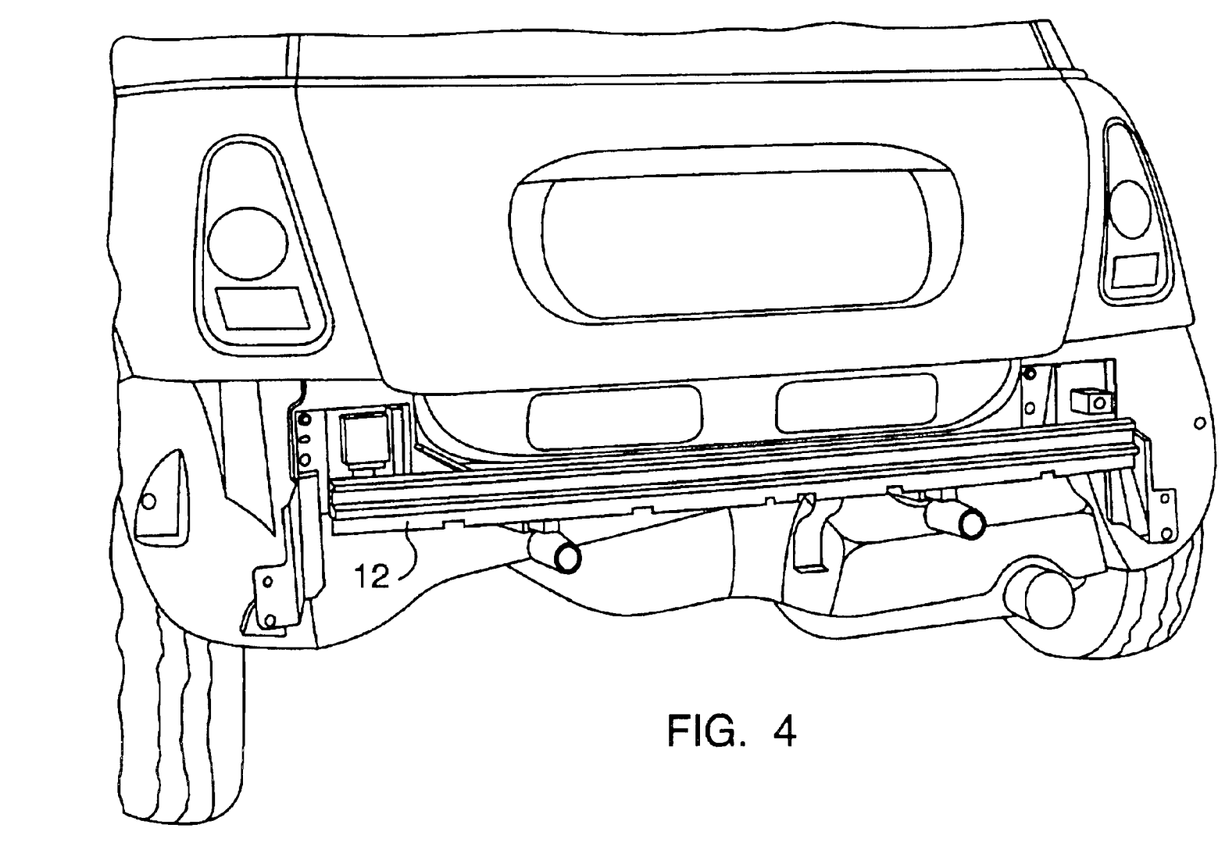
FIG. 4 shows the bumper support provided on the vehicle, and more particularly on the beam illustrated in FIGS. 2 and 3.

As mentioned previously, the vehicle bumper is conventional, and has a decorative crash absorbing plastic cover portion, which is removable as suggested in FIG. 4, and which is supported by an underlying crash bar or structural sport member 12. This member 12, as shown in FIG. 4, can be mounted onto the lands of the beam 10 as shown in FIG. 4 so as to allow the decorative rear bumper of the vehicle to be resecured to the vehicle once the beam has been mounted to the vehicle.

Figure 1:
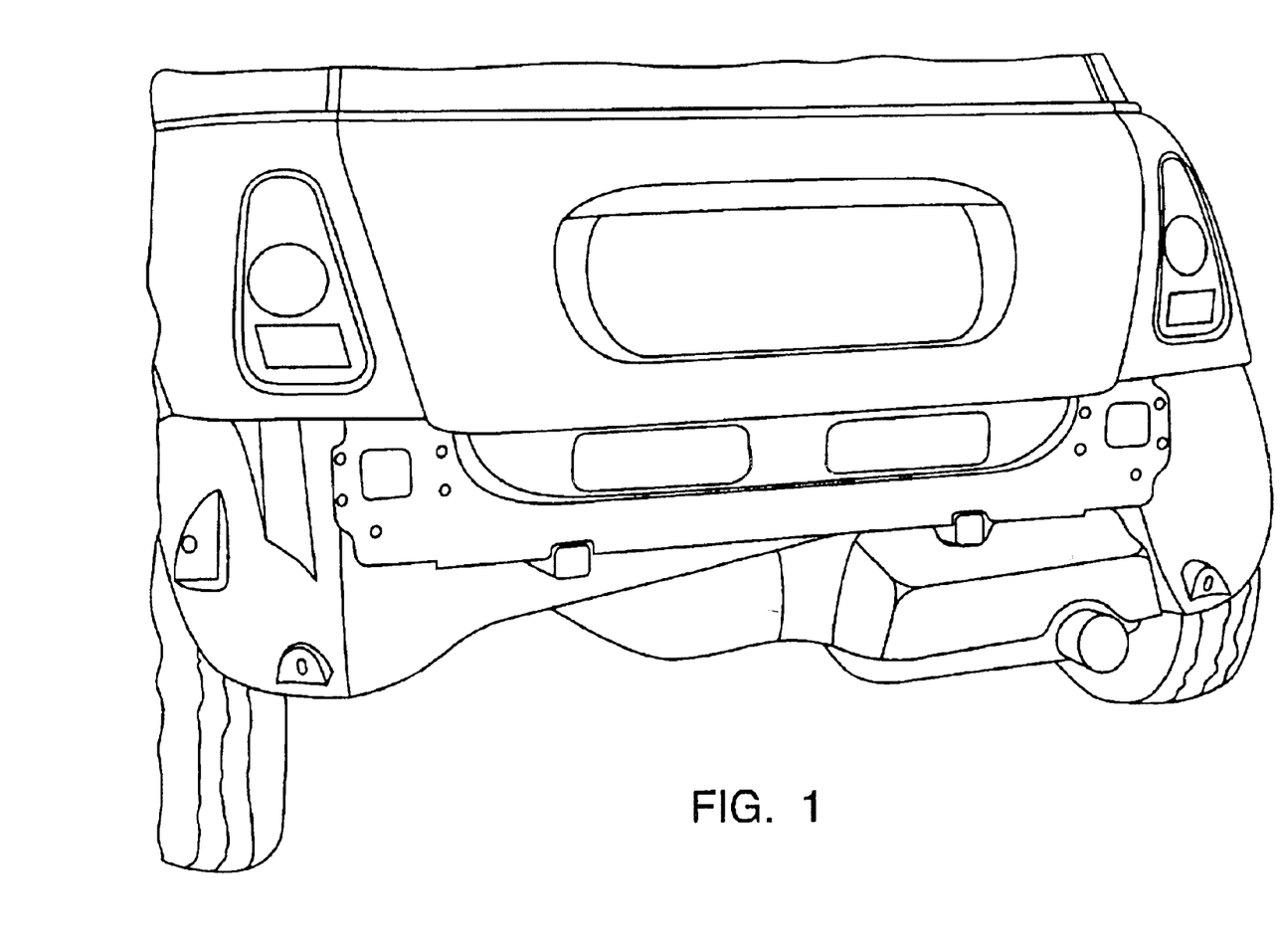
FIG. 1 shows an automobile or vehicle of the type having laterally spaced attachment pads for receiving a bumper support or crash bar, which support is typically fitted with means for attaching a decorative shock absorbent bumper cover. Such a cover is shown in FIG. 5. A structural support adapted to hold such a bumper cover is depicted in FIG. 4.

In accordance with the method of the present invention the crash bar support portion of the bumper as well as the plastic decorative cover portion thereof are removed as suggested in FIG. 1. The beam 10 of the present invention is then secured to the vehicle as described above, and as best shown in FIG. 3. The vehicle also includes structural members conventionally formed in the basic "unibody" construction. These structural members are provided by the manufacturer behind the attachment pads shown in FIG. 1. Further structural members can be seen in the vehicle as suggested by the square cross sectional members which are rearwardly open and extend from the underside of the vehicle as best shown in FIG. 1. These further members are utilized in the preferred embodiment shown in the drawings by providing bars $10_C$ projecting oppositely to the rearwardly open socket defining portions of beam 10. Thus, in the preferred embodiment, advantage is taken of the structurally secure portions of the vehicles unibody construction. The purpose of the beam 10 is to provide a link between the vehicle and a load carrying device to be described. Such a load carrying device may comprise a ski rack, a bicycle rack, a luggage carrier or a platform for a storage box that also serves as a table. A trailer can also be accommodated with a frame of appropriate configuration (see FIG. 6).

Figure 5:
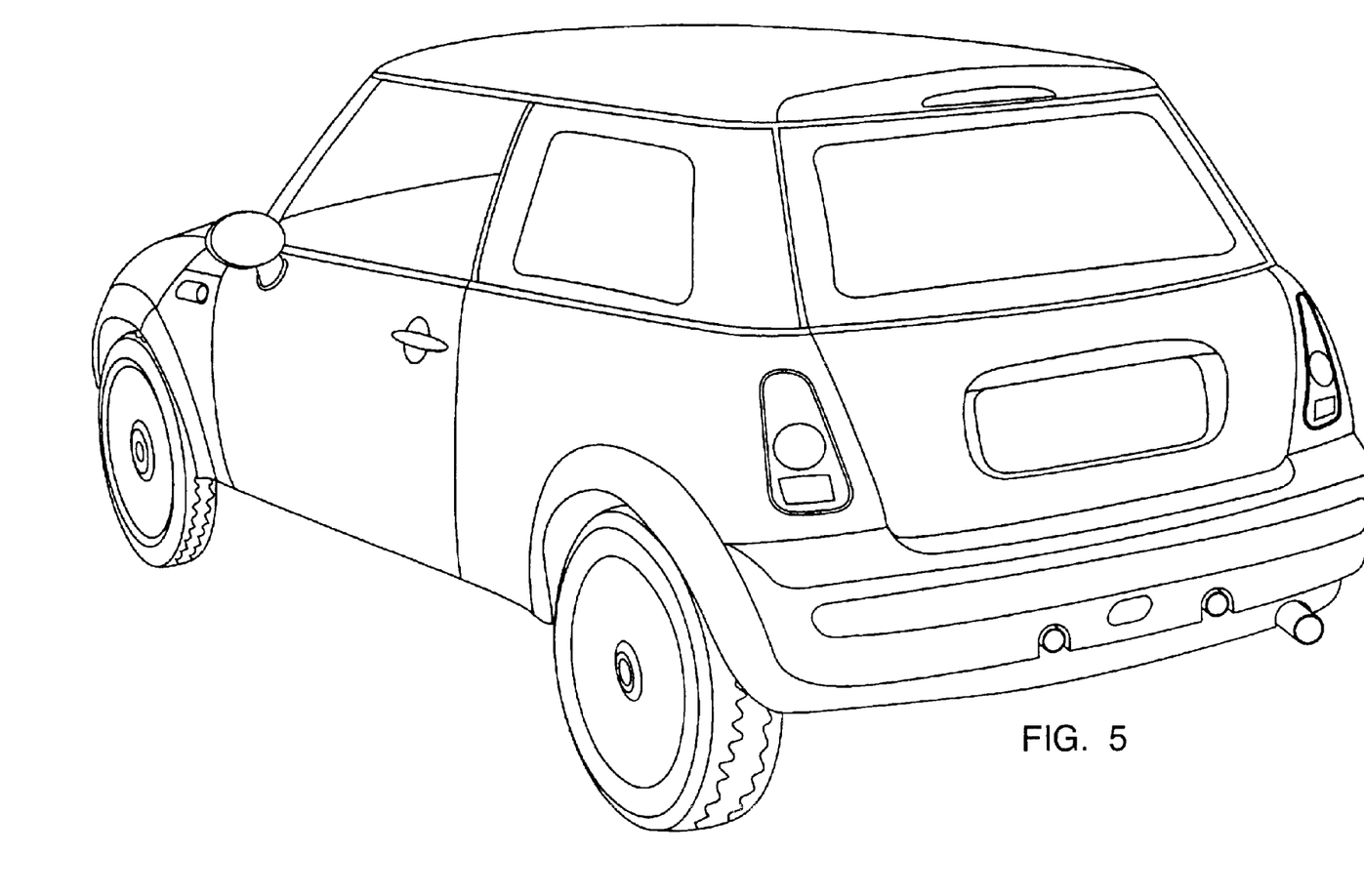
FIG. 5 shows the vehicle after reattachment of the bumper cover, the only part of the beam of the present invention, which is visible being the rearwardly opened sockets.

In further accordance with the present invention, the plastic bumper cover is reattached as shown in FIG. 5 to the structural support or crash bar shown in FIG. 4.

Figure 6:
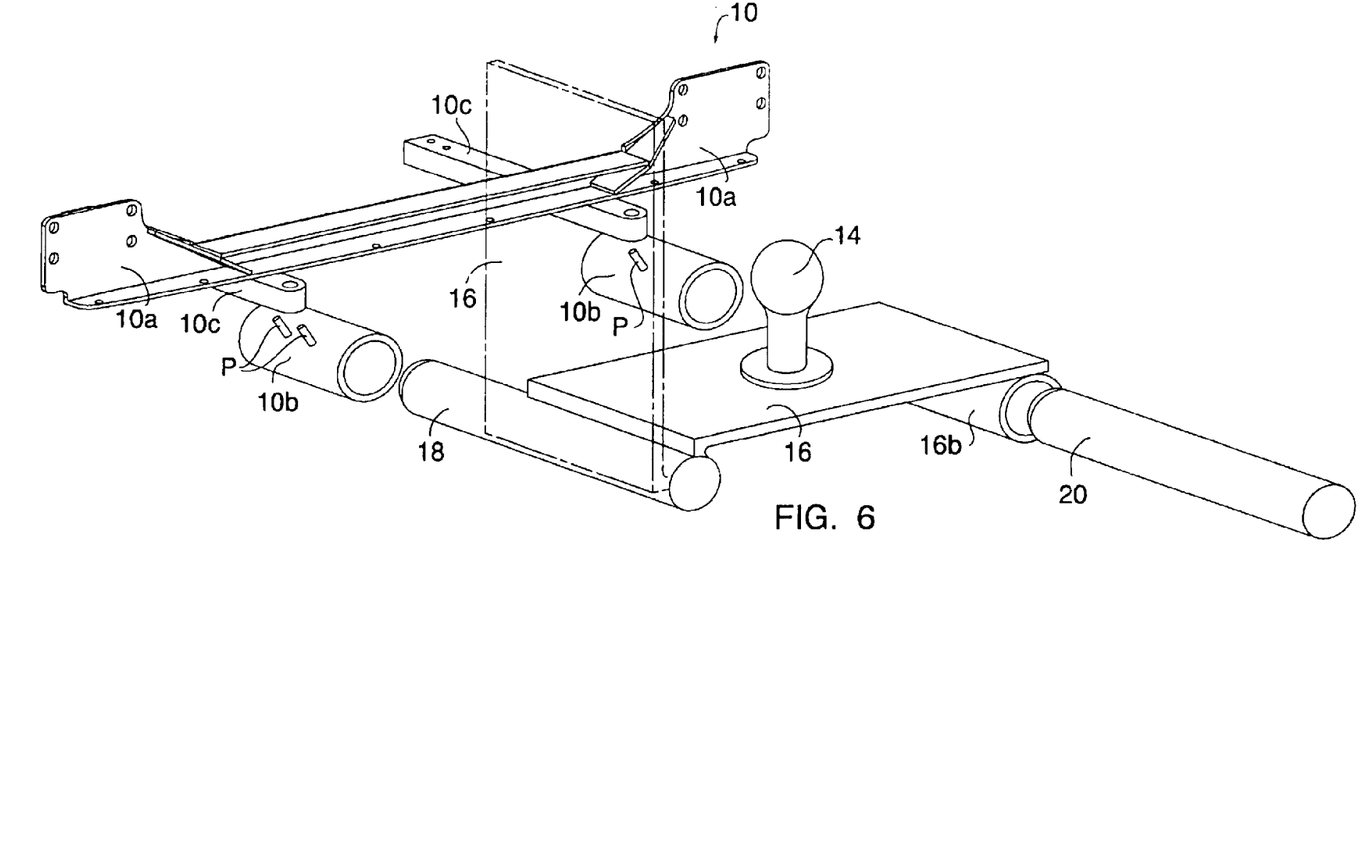
FIG. 6 is a perspective view showing a frame in exploded relationship to a carrier beam with the two slide bolts or pins for securing these components. The frame has a conventional ball socket for receiving a conventional trailer and is shown in an initial broken line position for insertion of the primary slide bolt.
Figure 7:
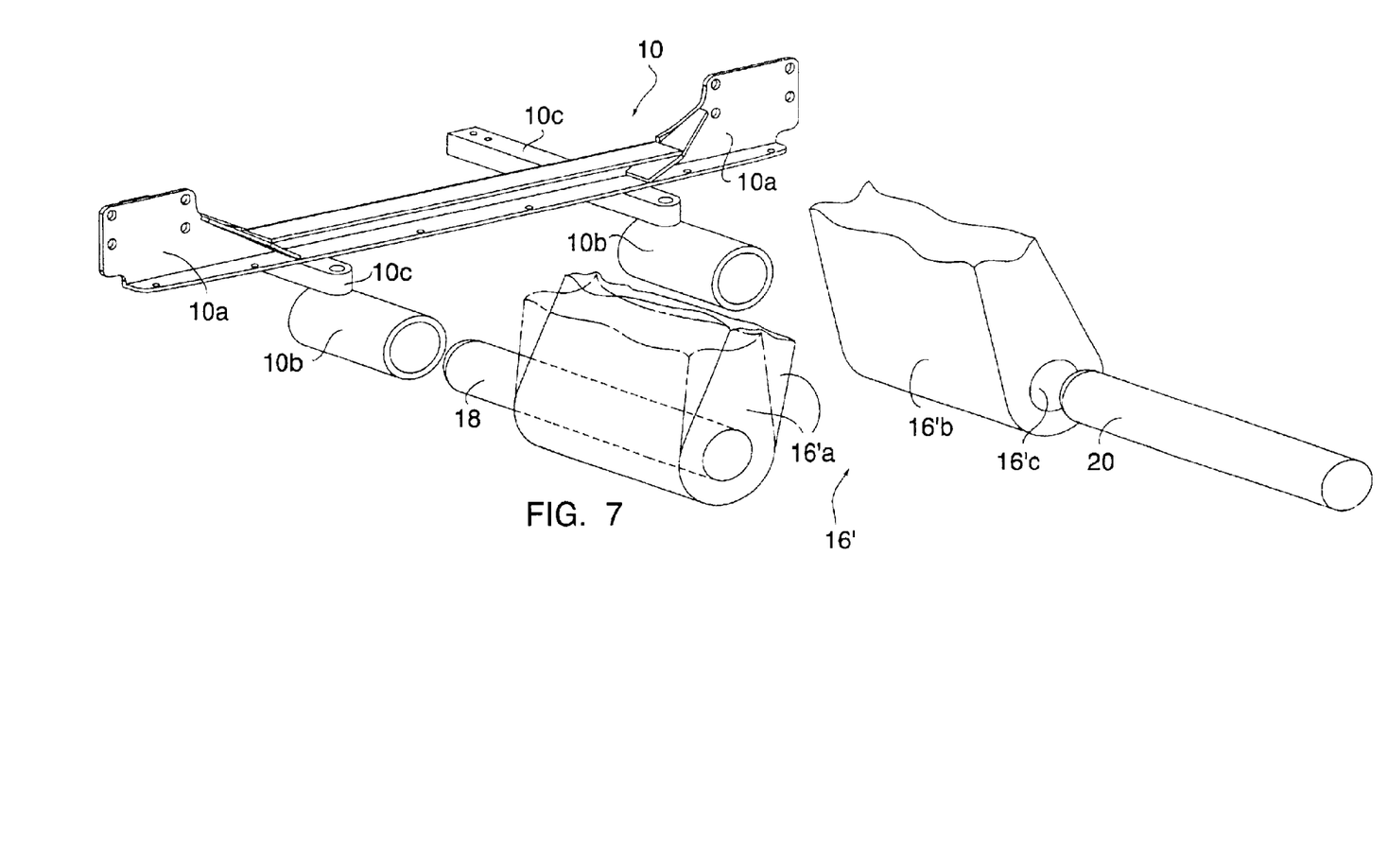
FIG. 7 is a perspective view of another frame, for use in carrying bicycles or skis for example, being assembled with the carrier beam socket as in the previous view.

FIGS. 6 and 7 illustrate the complementary slide bolt and receptive socket configuration used to couple the load carrying device or devices to the above-described support beam 10. Basically, a frame structure is provided that is dictated by the particular load to be carried, and in FIG. 6 a trailer hitch ball 14 is shown mounted on a frame which preferably takes the form of plate 16 that is secured to a primary slide bolt or pin 18 so that the frame or plate 16 can be oriented in the vertical position shown in broken lines in FIG. 6, allowing the slide bolt 18 to be inserted in the socket $10_B$. The slide bolt 18 is preferably provided with a cam slot that cooperates with one or more pins inside the socket $10_B$, so the rotation of the frame from the vertical broken line position shown to the solid line position shown will lock these components in assembled relationship to one another. Further, and in order to assure that the plate 16 remains horizontal when so assembled, a secondary pin 20 is provided in a socket portion $16_B$ in the frame 16 so as to be received in the opposite socket $10_B$ in the beam 10. This pin 20 also rotates so as to lock the pin 20 and hence the frame 16 in position relative to the support beam 10.

FIG. 7 shows a similar arrangement, but the frame 16' is preferably in the form of an A-frame with angularity related legs $16'_A$ and $16'_B$. Here again, the primary slide bolt or pin 18 is mounted in the lower end of the leg $16'_A$ and the entire frame 16' can be rotated through 90° or something less than 90° to lock the primary pin 18 in place. A secondary pin 20 is inserted in an opening $16'_C$ so as to secure the frame 16 in assembled relationship to the carrier beam 10.

Figure 8:
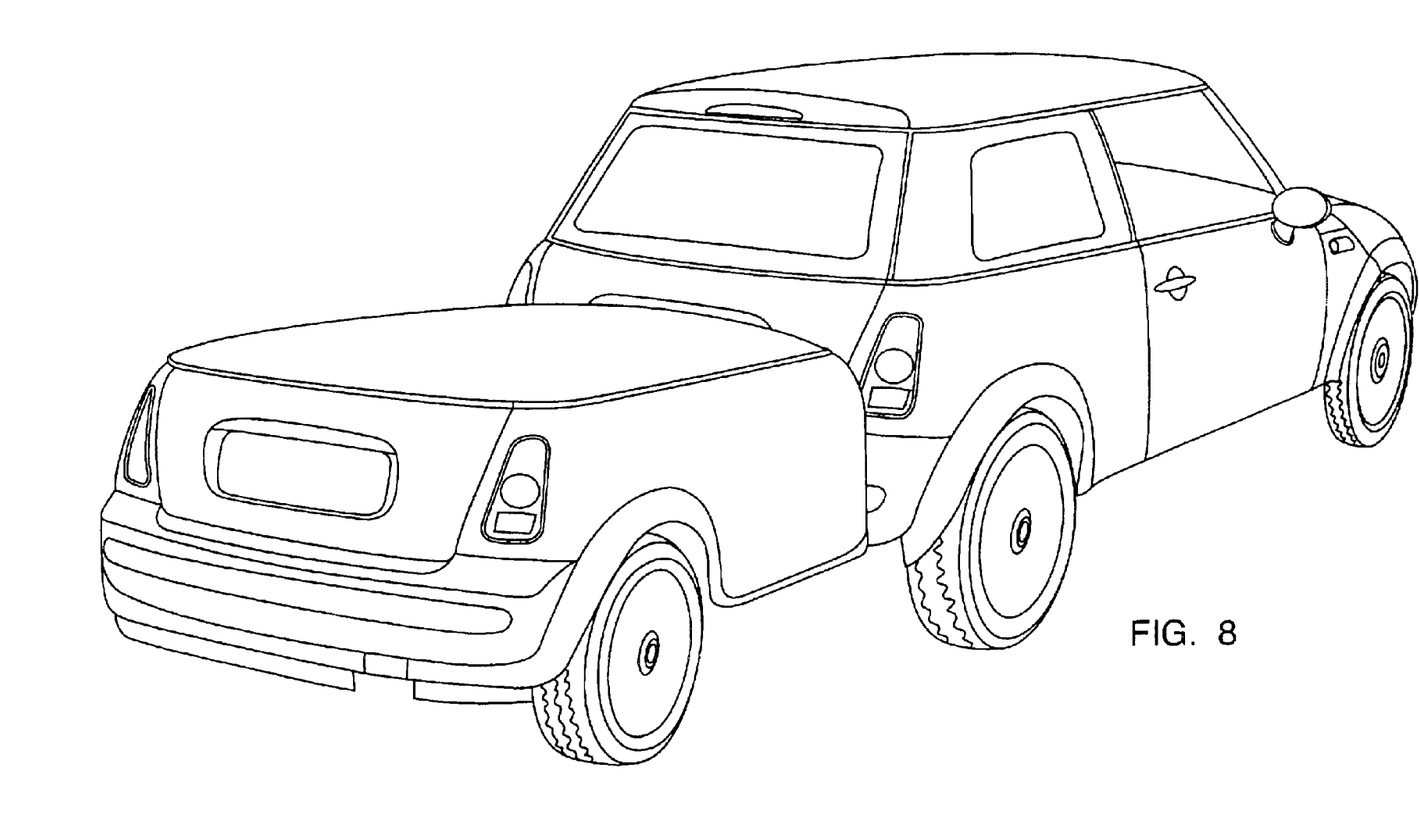
FIG. 8 shows a trailer such as that referred to with reference to FIG. 6.
Figure 9:
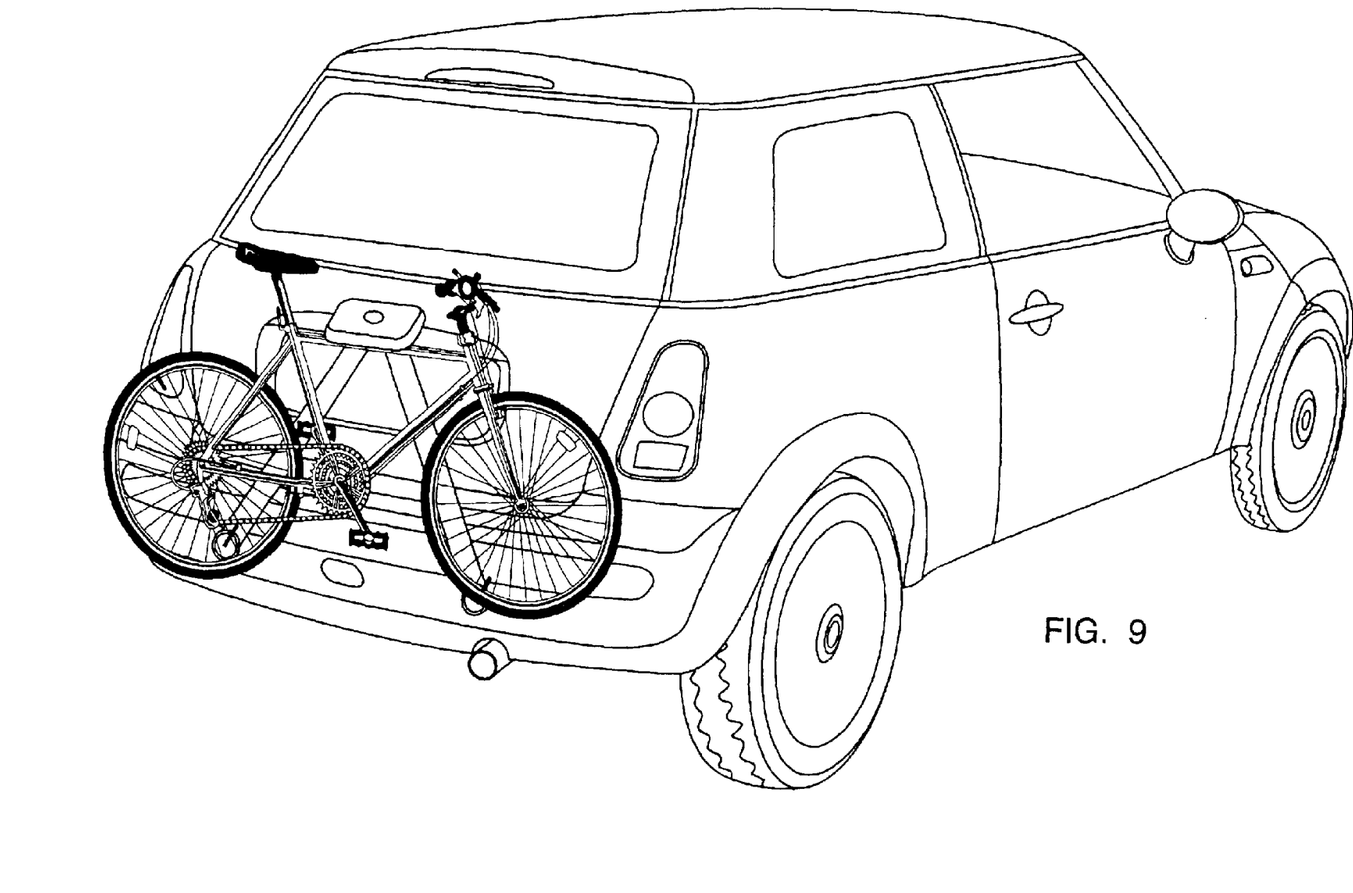
FIG. 9 shows a bicycle rack such as that referred to with reference to FIG. 7.
Figure 10:
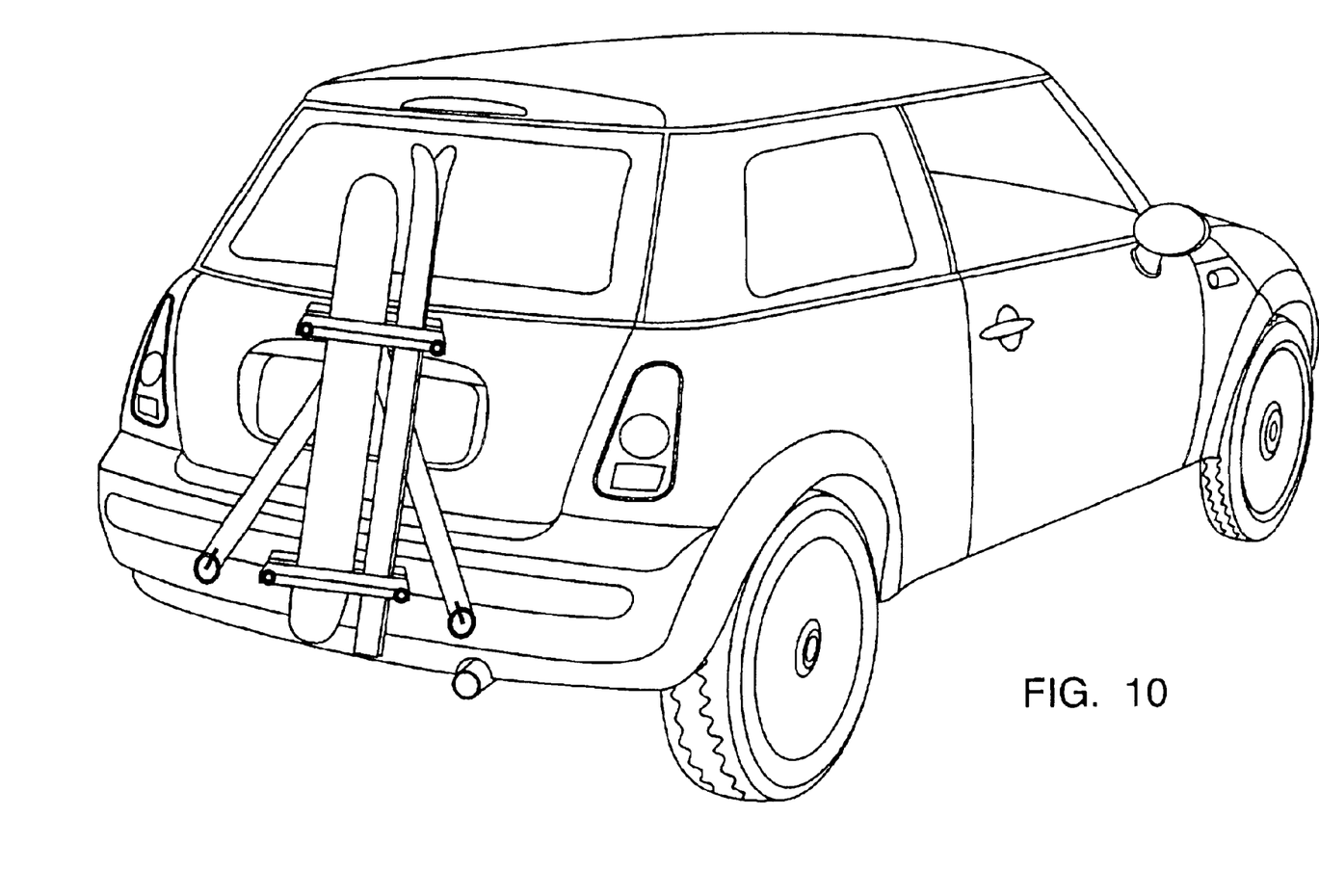
FIG. 10 shows a ski rack such as that referred to with reference to FIG. 7.
Figure 11:
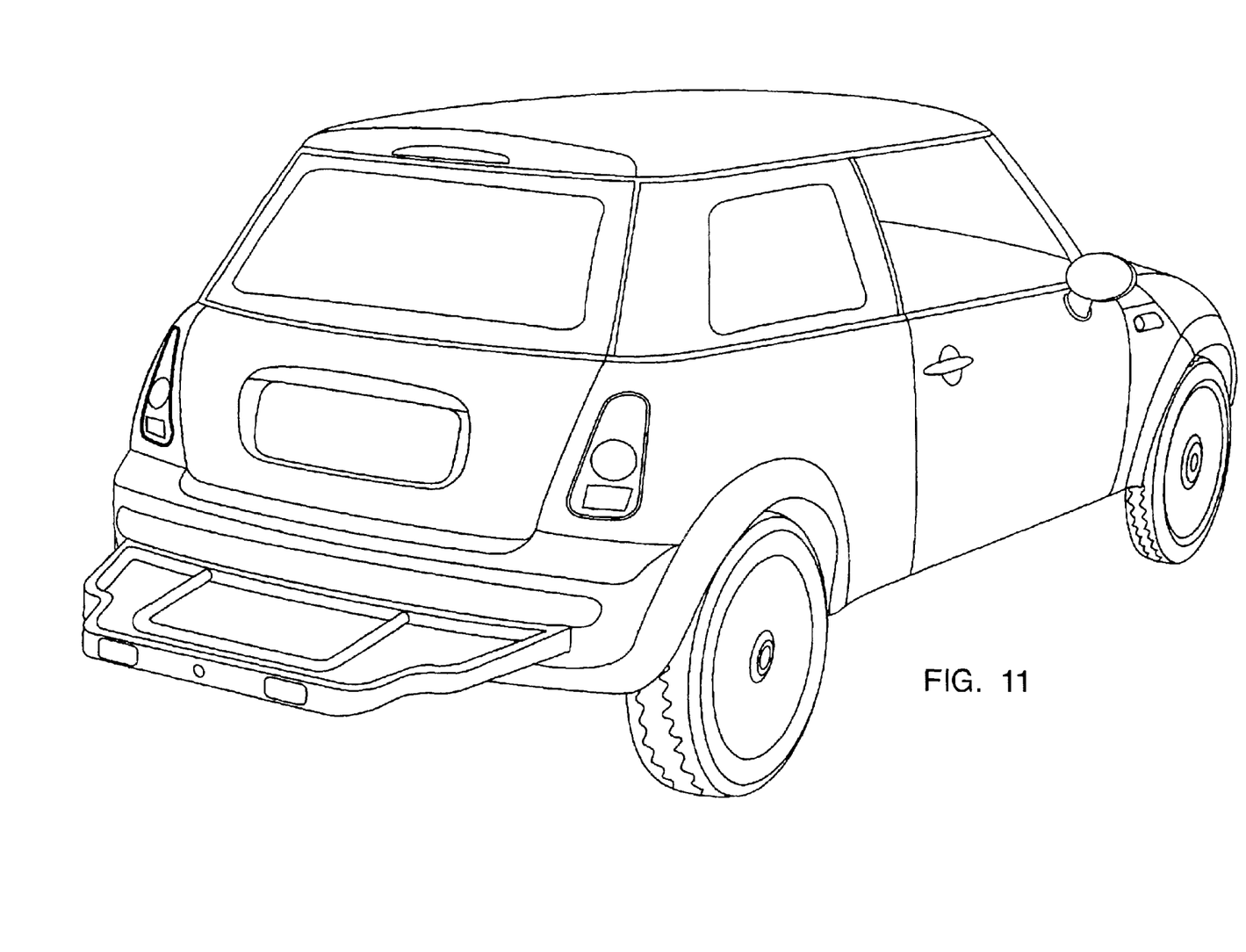
FIG. 11 shows a support platform or table such as that described below with reference to FIG. 6.
Figure 12:
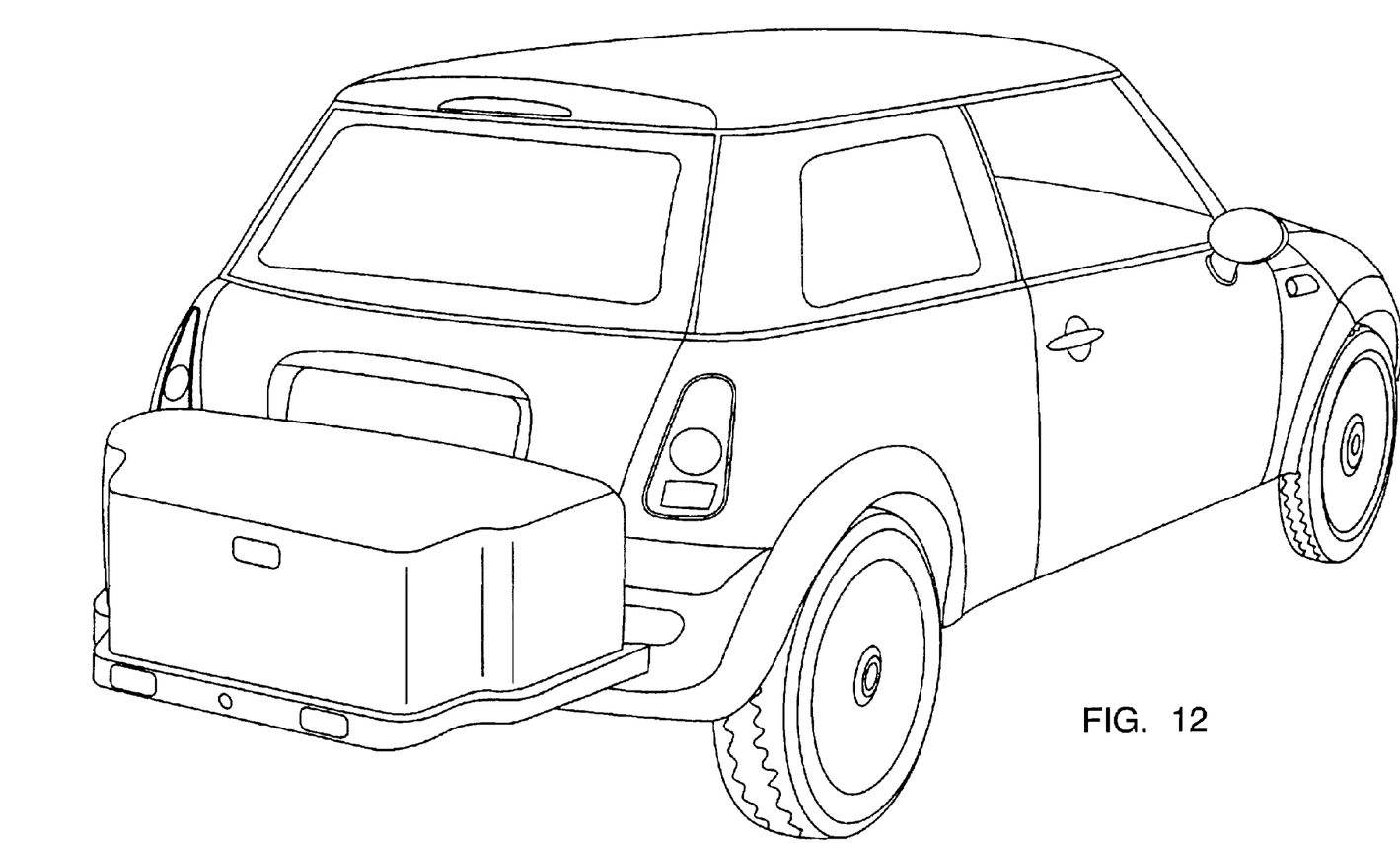
FIG. 12 is similar to FIG. 11 but shows a storage box on the platform.
Figure 13:
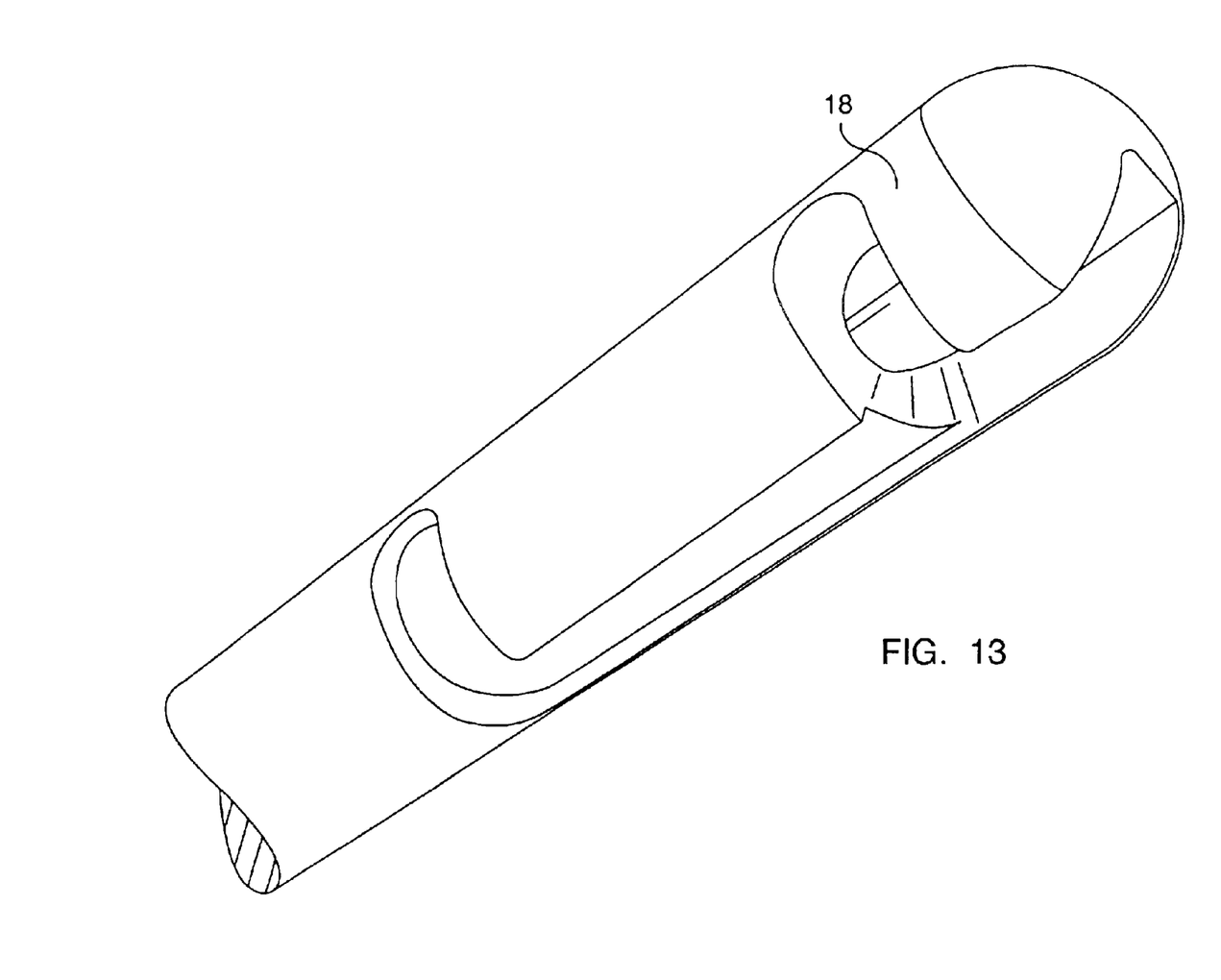
FIG. 13 shows in detail the cam slots defined in the primary pin or slide bolt of FIGS. 6 and 7.

FIGS. 8 and 9 show respectively, and admittedly in somewhat schematic fashion, the load to be carried by the frames illustrated in FIGS. 6 and 7 respectively.

In accordance with the present invention other frames can be adapted for carrying loads of varieties similar to the trailer and bicycle load described above. For example, frames with the same primary and secondary pin configurations described above can be devised for loads of different types; including tables, storage boxes, fishing pole holders, skis and snowboards, and even such recreational equipment as umbrellas and tables. In summary, the present invention has two aspects, one the mounting of the support beam to the vehicle unibody pads that are also used to support the bumper, and in its second aspect comprises a frame selected from a plurality of unique frame. Each frame has at least one primary slide bolt or pin, and a secondary slide bolt or pin movably mounted in that frame such that the frame can be secured by the slide bolts to the beam.

In light of the above, it is to be understood that within the scope of the appended claims, the invention may be practiced otherwise and as specifically described.

What is claimed is:

1. In a motor vehicle having bumper attachment pads provided in spaced relationship in the vehicle, the improvement comprising:

a support beam having spaced support lands constructed and arranged to fit the spaced attachment pads in the vehicle body, said beam having at least two rearwardly open sockets arranged below said lands and also spaced horizontally apart below and between said support lands, a load carrying frame having at least one forwardly projecting primary slide bolt received in at least one of said sockets, a secondary bolt movable independently of said primary slide bolt and received in a second of said at least two sockets whereby said frame is adapted to support a load to be carried by the vehicle.

2. The combination of claim 1 wherein said frame is selected from a plurality of frames, each of which frames of said plurality is specifically designed to carry a different load.

3. The combination of claim 1 wherein said spaced attachment pads of said support beam are so constructed and arranged so to support the vehicle bumper in a manner that obscures said support beam except for the sockets which project outwardly of the vehicle below the bumper.

4. The combination of claim 1 wherein said primary slide bolt is rotatably received in said at least one socket, said slide bolt and socket having complementary mating surfaces so that relative rotation therebetween prevents said slide bolt from sliding movement in said socket when assembled therein.

5. The combination of claim 1 wherein said load carrying frame has said primary slide bolt provided in fixed relationship thereto, said secondary slide bolt being movably mounted in said frame and separately lockable in said second socket.

6. The combination of claim 1 wherein said support beam lands are spaced from one another by a dimension T, and wherein said sockets are spaced from one another by a dimension in the range of T/2 and T/4.

7. The combination of claim 1 wherein said support beam is of elongated configuration, and has a flanged cross-sectional shape to enhance its strength, and wherein said lands of said support beam are offset upwardly of said elongated beam, said sockets being defined as depending struts which are offset downwardly of said elongated beam.

8. In a vehicle of unibody construction having a bumper assembly that includes a crash bar mounted to spaced attachment pads in the vehicle body, the improvement comprising;

a beam having spaced support lands constructed and arranged to fit the spaced attachment pads, said beam having at least two socket openings arranged below said spaced support lands;

at least one protecting bolt received by one of said socket openings and adapted to support a frame selected from a plurality of frames, each frame being constructed and arranged so that it will accommodate at least one article of predetermined size and shape to be transported, said socket opening defining a radially inwardly projecting pin, and said projecting bolt defining a cam slot for providing a bayonet type connection between said socket opening and said projecting bolt.

9. The combination according to claim 8 further including a second projecting bolt received in another of said two socket openings, at least one of said bolts being rotatable relative said frame for securing said frame in a fixed position relative said beam.

10. The combination according to claim 9, wherein said projecting bolts have cam slots, and said sockets have pins to provide a bayonet connection to secure said frame.

11. The combination according to claim 10 wherein said one projecting bolt is mounted in said frame, and said second bolt is rotatably received in said frame.

12. The combination according to claim 10, wherein said second projecting bolt is not mounted in said frame.

* * * * *